July 9, 1940.  E. MYERS  2,206,971
METHOD OF MANUFACTURING GOLF BALLS
Filed March 15, 1939
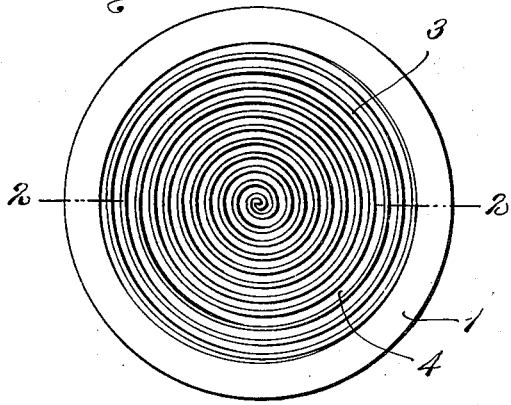
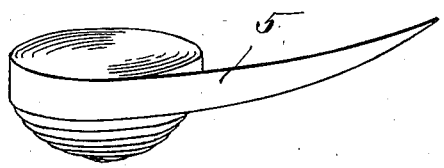
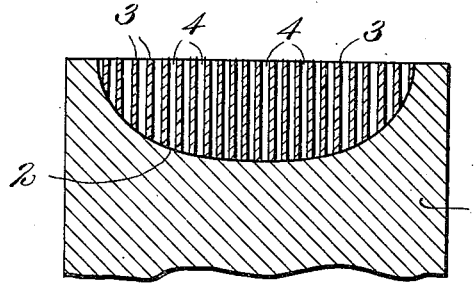
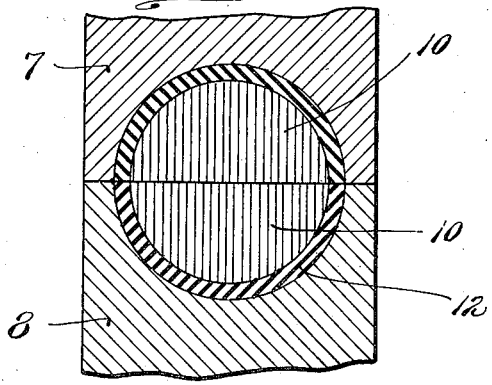
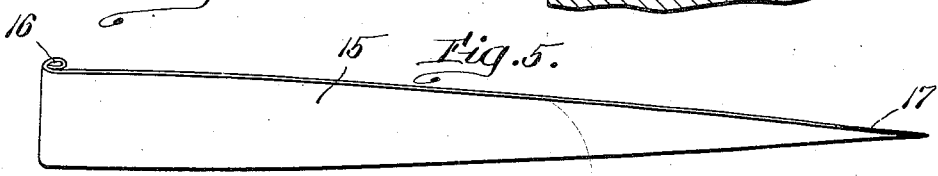
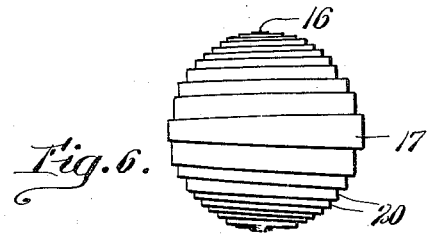
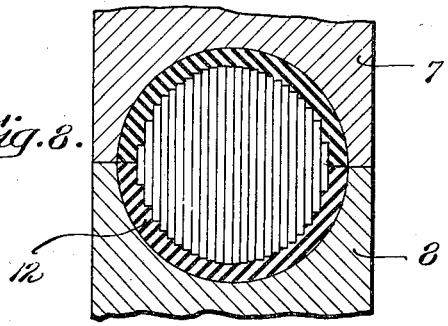
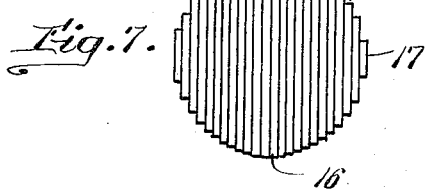
Inventor.
Edward Myers
by James R. Hodder
Atty.

Patented July 9, 1940

2,206,971

UNITED STATES PATENT OFFICE 2,206,971

METHOD OF MANUFACTURING GOLF BALLS

Edward Myers, Waltham, Mass.

Application March 15, 1939, Serial No. 262,027

1 Claim. (Cl. 154—17)

My present invention is a novel and improved golf ball and includes a novel method of manufacture.

Heretofore in the manufacture of golf balls it has been customary to utilize long lengths of thin elastic thread, which were wound about a core until a suitable size or diameter was attained; whereupon a gutta percha, or other covering material, was molded thereon.

The difficulty with such prior processes, as well as with the resultant product, was that it was expensive, a very high-grade of rubber was required for the making of the elastic thread, and a most serious objection was that during use the threads were apt to be broken by the blows of the golf club and, hence, the entire ball distorted, rendered lop-sided, and useless.

My present invention aims to eliminate the difficulties above briefly outlined and, furthermore, to provide an efficient and economical process of manufacture which will result in a greatly improved product, producing a golf ball which will retain its resiliency, shape, contour, and balance to a much higher degree than has heretofore been possible, as well also to provide an economical and efficient method of manufacturing same.

In carrying out my invention I provide appropriately cut and formed strips of elastic material, such as rubber, said strips being of substantial width and thickness and, therefore, of much greater strength than the rubber thread formerly used.

After the production of my improved strips they may be quickly and easily wound into the proper conformation for the manufacture of the golf ball and to receive the enclosing cover. Preferably, I so form these rubber strips that they may be easily coiled into a semi-spherical form, either coiling the same about a core or independently of a core; and thereupon I assemble two semi-spherical portions and unite the same by adhesive or a covering coating and thereupon apply the outer finishing gutta percha, or other covering, molded thereon into final form and contour.

The resultant product is a highly resilient article with inherently strong rubber strips or portions in place of the normal weak elastic threads heretofore used, and my improved product will resist distortion, lopsidedness, or the like from any blow to which it may be subjected during use, and will maintain both its spherical contour, its balance, and its resiliency.

In carrying out the invention, I may produce the rubber strip-like portions from which the ball or the semi-spherical ball sections are made in any suitable manner. The same may be cut flat from a sheet or other strip and then coiled into shape, either with or without a core. Such strips may be also molded by forcing plastic rubber into a spiral semi-spherical mold with a plurality of partitions or other means to form the same into a strip-like contour, which, when taken from the mold will naturally return to its spiral shape and more easily be wound into the spherical contour desired.

I believe that my process of forming a spiral mold in semi-spherical form, into which mold plastic rubber is forced and, preferably cured, is a distinct novelty in this art and I wish to claim both the process and the improved spiral mold herein.

Furthermore, the use of two semi-spherical and spirally molded rubber sections to form a completed golf ball, which are united and thereafter covered, is a novel and improved method.

Furthermore, my alternative process whereby a substantially wide, strong strip, suitably contoured so that it may be wound either upon a core or upon itself, and thus produce a substantially spherical golf ball, made of strong, relatively thick, and wear-resisting interrolled strips, is believed to be novel.

My resultant product constitutes a golf ball which has in many ways the advantages of a solid rubber ball, as well as the advantages of an interrolled strip construction, and with the latter having the additional advantages of a rigid, strong, and relatively wide and thick strip wound under tension, which will be proof against damage, breakage, lopsidedness, or unbalancing during use, and with a longer life, which has heretofore been impossible with either a solid or strip-wound structure.

Referring to the drawing illustrating preferred embodiments of my present invention and methods of carrying out the same, Fig. 1 is a plan view of my improved and novel spiral semi-spherical mold;

Fig. 2 is a cross-sectional view on the line 2—2 of Fig. 1;

Fig. 3 is a perspective view illustrating the strip made in the mold of Figs. 1 and 2 after the same has been removed therefrom and interrolled upon itself to form the semi-spherical section of the golf ball;

Fig. 4 illustrates the completing of the two semi-spherical sections with the covering material and molded into final form, the same being formed in a fragmentary cross-sectional view;

Fig. 5 is a diagrammatic view on a reduced scale of a modified form wherein the strip for the entire ball is cut from flat sheet material and interwound upon itself;

Fig. 6 illustrating the strip of Fig. 5 wound into spherical contour form;

Fig. 7 is a corresponding view at right angles of the ball shown in Fig. 6, and

Fig. 8 is a fragmentary cross-sectional view illustrating the molds and applying the covering material to the completed golf ball.

As shown in the drawing, I provide a mold having a base 1, with a recess 2 divided by a spirally formed partition 3 extending from the center outwardly to the rim of the base 1 and dividing the recess 2 into a spiral ribbon-like area 4 into which plastic material is forced to produce a tapered strip 5, as shown in Fig. 3 after the same is removed from the spiral mold 1.

The strip 5 having been formed and preferably cured in the mold 1 with the spiral partition 3, as above noted, is thus normally in the same wound condition and will greatly facilitate the interrolling of the strip 5 on itself or on a core to complete a semi-spherical golf ball section 10, see Fig. 4. A duplicate semi-spherical section 10 is thereupon produced and both are united and the golf ball completed by a covering 12 molded to proper shape, contour, and finish in a pair of molds 7 and 8, as shown in diagrammatic form in Fig. 4.

It will be appreciated that the spiral mold is of sufficient width and appropriate depth to produce a strip 5 between the spiral partition 3 so that the same will be capable of being wound into a standard size golf ball form when the strip 5 is withdrawn from the mold 1, wound under tension, and applied into the molds 7 and 8, with the covering material 12.

My novel spiral method of molding results in a substantially smooth semi-spherical section, as shown, because of the contour of the recess 2 in the mold 1, leaving very little unevenness when the strip 5 is molded and compressed into the contour of the golf ball section 10.

Referring to Fig. 5, I have illustrated a long ribbon-like strip 15 of substantial thickness, cut from flat elastic material and coiled on itself beginning at the thicker end as shown at 16, and with the tapered end 17 constituting the final winding around the greater diameter.

In this form the ribbon 15 is wound under tension and completes the spherical portion of the golf ball with a single winding, ready for the final molding operation in the mold 7 and 8, wherein the covering material 12 is applied, as will be readily understood. Owing to the thickness of the ribbon-like strip 15, this method leaves small steps 20, as indicated in Figs. 6, 7, and 8 but these are enclosed by the covering material 12 and a compression of the molds 7 and 8 so that a solid supporting contour is obtained for the covering material 12, which is interlocked therewith by reason of the notches 20, as will be readily appreciated.

It will be seen that I have produced a strong, economical, novel structure for a golf ball, which is made of substantially thick and wide ribbon-like elastic material, each winding being capable of withstanding heavy blows and stresses during use and, therefore, preventing the danger of breaking and fracturing the windings. Furthermore, the added thickness and width of my strip material, either 5 or 15, increases the resiliency, maintains the balance in the ball, and greatly increases the life and usefulness thereof, in addition to preventing lopsidedness, distortion, and breakage when thin narrow threads are employed, as formerly.

Thus, I obtain the wear-resistance and advantages of a solid rubber ball, together with the added features of the strip structure wound under tension and, in addition, my method produces an improved golf ball structure insuring long life, balance, usefulness, and resiliency.

I claim:

The improved process of golf ball manufacture, which consists in molding strip material into spiral semi-spherical form, removing the same from the mold, and thereafter tightly interrolling said strip into a semi-spherical section, uniting said section with a similar semi-spherical section, and applying a completing and protecting covering.

EDWARD MYERS.